United States Patent Office 3,238,030
Patented Mar. 1, 1966

3,238,030
PROCESS FOR PREVENTING SCALE IN GLASS FURNACE
Thomas B. O'Connell and Howard R. Swift, Toledo, Ohio, and James E. Mambourg, Shreveport, La., assignors to Libbey-Owens-Ford Glass Company, Toledo, Ohio, a corporation of Ohio
No Drawing. Filed Mar. 28, 1961, Ser. No. 98,780
3 Claims. (Cl. 65—27)

This invention relates to a process for producing glass of improved quality. More particularly, the invention relates to a process for reducing defects in glass originating from loosely adherent crystals on the siliceous refractory in a glass melting furnace.

In the production of glass, such as sheet or plate glass, which is conventionally of a soda-lime-silica type, it has been observed that a porous crystalline scale forms on the surface of the silica refractory walls of a glass furnace above the melt and particularly on the refractory roof of the furnace. This phenomenon is believed to result from the gradual attack of the silica by alkali and sulfate vapors from the glass itself and from the batch from which the glass is made. These vapors react with the silica in the refractory to form a silica rich glassy phase which partially re-crystallize into a siliceous scale. Analysis of this scale reveals that it contains a polymorphic mixture of tridymite and cristobalite crystals together with a glassy matrix.

It has also been observed that after a prolonged period of time, during which it is believed that the alkali and sulfate vapor attack continues, the scale is ultimately destroyed resulting in the formation of a dense glassy coating on the refractory. When the alkali attack on the refractory is rapid, this scale is quickly converted to the dense glassy coating covering the refractory. When the alkali attack is gradual, however, the scale continues to build upon the refractory and under certain conditions, the exact nature of which is not understood, it has been observed that the rate of formation of the glassy phase is greater than the rate of re-crystallization whereby the glassy matrix increases producing a tacky form of scale which is loosely adherent to the refractory surface.

The formation of the siliceous scale and especially the formation of the tacky form of the scale has been observed to occur principally at glass refining conditions. Specifically, this phenomenon has been observed in furnaces with a substantially pure silica refractory operating at refining temperatures in the range of about 2000 to 2700° F. in the presence of soda-lime-silica glass. In a continuous melting and refining furnace of the type in which a batch mixture is introduced at one end of the furnace, is reduced to a molten state in a melting tank or chamber from which it flows into a glass conditioning section and is thereafter removed from the latter section as a homogeneous molten material, the siliceous scale is primarily to be found on the refractory in the conditioning section of the furnace. No heat is applied directly to the molten glass in the conditioning section of the furnace but rather the glass is merely retained in this section while its temperature is reduced in a controlled manner and until the molten bath is in a desirable condition for removal from the furnace. While this is the primary function of this section of the furnace, it is commonly referred to in the art, and will be so identified herein, as the refining section or chamber of the furnace.

During the glass making process, the relative loosely adherent siliceous scale spalls or flakes off of the surface of the silica refractory and drops into the molten bath of glass. Since the cristobalite or tridymite crystals are not readily soluble in molten glass, they are carried into the glass sheet or other article formed from the melt and appear therein as small, translucent white crystalline inclusions commonly known as "stones." These "stones" or contaminations are readily noticeable and ruin the glass as regards acceptable commercial quality.

Accordingly, it is a primary object of the present invention to provide a process for producing glass which is free of defects caused by crystalline contaminations or "stones."

Another object of the invention is to provide a process of reducing the formation of loosely adherent crystals on the silica refractory of a glass melting furnace.

A further object is to accomplish the foregoing by treating the silica refractory so as to reduce or eliminate the siliceous scale formed thereon, which treatment has no detrimental effects upon the glass being produced.

Previously, the silica refractory in a glass producing furnace has been treated, prior to its installation in the furnace, with various substances to retard the formation of siliceous scale especially in the refining section of the furnace. This can only be accomplished when the furnace is being originally constructed or portions of it are being rebuilt in a so-called "cold repair." In the latter operation, glass production is halted and the furnace allowed to cool enabling its walls to be reconstructed.

Experience has indicated that the formation of the siliceous scale often occurs more or less in scattered patches on the refractory and that its formation, at least in a critical sense as regards glass defects, commences after the furnace has been in operation for a period of time. The lapse between the time the furnace is put into operation and the occurrence of the "stones" in the glass produced varies. Usually, the furnace is over a year old when the defect is first noticed although the defect has been observed in furnaces which have been in operation only eight mounts while, on the other hand, in some furnaces the stones never appear. Since the exact cause of the scale formation is not fully understood, it is difficult to anticipate with any certainty if, where or when the scale will appear or whether, when it appears, it will contaminate the molten glass and thus give rise to glass defects.

In accordance with the present invention, the refractory of a glass furnace is simply and inexpensively treated after the scale appears by a process which is performed while the furnace is in operation, thus eliminating the need for relatively costly pretreatment of the refractory or cold repairs of the furnace. Generally stated, the present process comprises inducing or, at least, promoting further and more rapid akali attack to dissolve the scale and produce a glazed surface on the refractory.

The invention is based upon the observation that sodium sulfite will react, under the proper conditions, with the silicon dioxide scale and produce a sodium silicate glass which serves initially to "glue" the scale to the refractory and thereby prevent its spalling or flaking off into the molten glass. It has also been observed that in the production of glass in a continuous-type melting and refining furnace, the silica refractory in an aged furnace becomes saturated with sodium sulfate fume condensate which is relatively inert and does not appreciably react with the siliceous scale in any manner. Based upon this observation, the present invention contemplates treating the refractory by reducing this sodium sulfate condensate assimilated in the refractory as well as the sodium sulfate fumes in the furnace while in contact with the scale whereupon it has been observed a vigorous action takes place with the formation of sodium silicate glass in and on the internal furnace walls. This sodium silicate glass, as pointed out above, acts as a glue in its first stages to prevent the scale from falling from the roof and walls of the furnace and, in addition, after a short period of time forms a dense glazed coating on the refractory protecting it from further alkali and sulfate fume attack.

As noted above, the problem of glass contamination is linked primarily with scale formed on the refractory in the refining section of the furnace. It has long been accepted that maintaining a reducing atmosphere in the refining tank of a furnace has a detrimental effect on the glass produced since the molten glass is reduced resulting in a particular defect or contamination of the glass commonly referred to as "seeds." However, we have discovered that under properly controlled conditions, a reducing atmosphere may be created and maintained in the refining end of the furnace. This reducing atmosphere may be achieved satisfactorily through the use of any reducing gas or source of reducing gas such as carbon monoxide, hydrogen, sulfur dioxide or dissociated ammonium and hydrocarbons, which gases are introduced into the refinery chamber of a glass furnace in a closely controlled manner whereby the atmosphere is reducing in nature, particularly adjacent the refractory to be treated, but is controlled within limits so as not to reduce the glass melt.

A practical, efficient and easily controlled method of producing a reducing atmosphere in the refining chamber, in accordance with the present invention, is to burn natural gas within the refinery in an air-gas burner adjusted so as to produce a flame which is slightly deficient in air. In this manner, the flame may be directed toward the area to be treated and the atmosphere thus concentrated primarily adjacent the refractory. In addition, by simply operating the burner in selectively timed off-on cycles, the reducing atmosphere may be controlled within limits so as to have very little, if any, adverse effect on the glass melt.

The air-deficient natural gas flame, as noted above, results in the formation of sodium silicate glass on the furnace walls by a chemical reaction between the liquid sodium sulfate condensate, the alkali and sulfate fume and the silica, which reaction is believed to be expressed by the following equation:

$$Na_2SO_4 + SiO_2 + CO \rightarrow Na_2SiO_3 + SO_2 + CO_2$$

The following description is given as an example of one embodiment of the present invention which has proven to be successful. However, it is not to be considered to provide a limitation on the invention and reasonable equivalents are to be included within the scope of the disclosure.

A suitable, adjustable natural gas burner is projected through a breastwall of the refining chamber of a continuous-type glass melting and refining furnace. The air-gas ratio of the burner is adjusted so that a large, bushy luminous flame sweeps the surface to be treated without touching the glass melt. Analyses are made periodically to assist in controlling the atmosphere of the refining chamber to maintain suitable reducing conditions. This control may be effected by adjusting the air-gas ratio of the burner and, in addition, by regulating the amount of outside air entering the furnace. The ingress of air into the furnace, of course, would be regulated by opening and closing the various ports and expansion joints normally found on such furnaces. The glass sheets are inspected throughout the treatment of the refractory so that the proper adjustments may be made to control the atmosphere in the refining chamber in case of any detrimental effect on the glass.

As noted above, to prevent adverse effect on the glass produced, the burner is operated on relatively short interval on-off cycles. Observations have shown that the optimum duration of the periods of this cycle vary from furnace to furnace with the ranges varying between cycles having equal on-off periods of thirty minutes each and cycles having an on period of one hundred minutes followed by an off period of twenty minutes.

It has been observed that when the burner is on, a tacky form of sodium silicate glass is formed on the refractory which, in effect, glues the scale to the refractory with the result that the occurrence of stones in the glass produced is materially reduced; in most cases to zero. When the burner is off the number of stones gradually increases but, at the same time, additional sodium sulfate fume enters the furnace and more condensate is absorbed by the refractory. Thus, when the burner is again operated the amount of liquid glass effective to cement the scale in place is increased. After the refining chamber has been subjected to the controlled reducing atmosphere for a period of time, it has been observed that a dense glassy coating completely covers the surface of the refractory preventing alkali and sulfate vapor attack on the silica thereby preventing the formation of the siliceous scale throughout the remaining life of the furnace.

It is to be understood that the form of the invention herewith described is to be taken as an illustrative embodiment only of the same, and that various procedural changes may be resorted to without departing from the spirit of the invention.

We claim:

1. In a process for reducing the formation of crystalline scale on silica refractory forming the roof and side walls of a glass melting furnace, the steps of, operating the furnace for a period of time to permit alkali and sulfate vapors from the molten glass and the batch materials to build up in the furnace, thereafter introducing a reducing gas into the furnace to maintain reducing conditions adjacent said refractory thereby to reduce said vapors and promote a reaction between the vapors and said silica refractory resulting in a liquid glass operable to cement said scale on the surface of said refractory, and regulating the amount of said reducing gas being introduced into said furnace to maintain the atmosphere at reducing conditions but insufficient to reduce the melt.

2. In a process for treating silica refractory forming the roof and side walls of a glass melting furnace to reduce the formation of crystalline scale thereon, the steps of operating the furnace for a period of time to permit alkali and sulfate vapors from the molten glass and the batch materials to be collected in the furnace, thereafter directing an air deficient natural gas flame into the furnace above the molten glass from a burner projecting through a wall of the furnace, positioning the burner so that the flame sweeps along a surface of the refractory to be treated whereby a reducing atmosphere is created adjacent said refractory to reduce said vapors and promote a reaction between the vapors and the silica refractory resulting in a liquid glass operable to cement said scale on the surface of said refractory, and operating the burner in sequential off/on cycles thereby to maintain the atmosphere at reducing conditions but insufficient to reduce the glass melt.

3. In a process for treating silica refractory as defined in claim 2, in which said burner is operated at alternating cycles having on periods of 30 to 100 minutes followed by off periods of 20 to 30 minutes.

References Cited by the Examiner

UNITED STATES PATENTS 2,994,519   8/1961   Zellers _____ 65—337 X

OTHER REFERENCES

Hodkin et al.: Textbook of Glass Technology, publ. 1925 by Van Nostrand, p. 368.

Tooley: Handbook of Glass Mfg., publ. 1953 by Ogden, p. 199.

DONALL H. SYLVESTER, *Primary Examiner.*